United States Patent
Na et al.

(10) Patent No.: US 10,234,717 B2
(45) Date of Patent: Mar. 19, 2019

(54) APPARATUS AND METHOD FOR ATTACHING POLARIZER

(71) Applicant: SAMSUNG DISPLAY CO., LTD., Yongin-si, Gyeonggi-do (KR)

(72) Inventors: Gwan Young Na, Yongin-si (KR); Sang Jae Kim, Yongin-si (KR); Jung Hun Lee, Hwaseong-si (KR); Hyo Sung Hong, Suwon-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 215 days.

(21) Appl. No.: 15/225,004

(22) Filed: Aug. 1, 2016

(65) Prior Publication Data

US 2017/0212383 A1    Jul. 27, 2017

(30) Foreign Application Priority Data

Jan. 22, 2016 (KR) .................. 10-2016-0008296

(51) Int. Cl.
*G02F 1/1335* (2006.01)

(52) U.S. Cl.
CPC .............................. *G02F 1/133528* (2013.01)

(58) Field of Classification Search
CPC .. G02F 2001/133538; G02F 1/133528; G03H 2223/22; G02B 2006/12116
See application file for complete search history.

(56) References Cited

FOREIGN PATENT DOCUMENTS

| JP | 2007140046 A | * | 6/2007 | ............. B32B 41/00 |
| KR | 20090126617 A | * | 12/2009 | ............... G02F 1/13 |
| KR | 20130041584 A | * | 4/2013 | ............... G02B 5/30 |
| KR | 101297379 B1 | | 8/2013 | |
| KR | 101419349 B1 | | 7/2014 | |
| KR | 101430670 B1 | | 8/2014 | |

OTHER PUBLICATIONS

Machine Translation for Kim, KR 2009-0126617 A.*
Machine Translation for Ra, KR 2013-0041584 A.*
Machine Translation for Nakahira, JP 2007-140046 A.*

* cited by examiner

*Primary Examiner* — David Bryant
*Assistant Examiner* — Christine Bersabal
(74) *Attorney, Agent, or Firm* — Cantor Colburn LLP

(57) ABSTRACT

A method of attaching a polarizer includes preparing a first stage on which a display panel is disposed and a second stage on which a first polarizer is disposed, measuring a shape of a curl of the first polarizer; determining an attachment direction of the first polarizer with respect to the display panel based on the measured curl shape of the first polarizer and attaching the first polarizer to a first surface of the display panel by rotating at least one of the first stage and the second stage based on the determined attachment direction.

8 Claims, 11 Drawing Sheets w1 w2

APPARATUS AND METHOD FOR ATTACHING POLARIZER

This application claims priority to Korean Patent Application No. 10-2016-0008296, filed on Jan. 22, 2016, and all the benefits accruing therefrom under 35 U.S.C. 119, the content of which in its entirety is herein incorporated by reference.

BACKGROUND

1. Field

The disclosure relates to an apparatus and method for attaching a polarizer.

2. Description of the Related Art

The importance of display devices has steadily grown with recent developments in multimedia technology. As a result, a variety of display devices such as a liquid crystal display ("LCD") device, an organic light-emitting diode ("OLED") display device, and the like have been developed and widely used.

The LCD device, which is one of the most widely-used types of flat panel display, typically includes two substrates, on which field-generating electrodes such as pixel electrodes and a common electrode are provided, and a liquid crystal layer interposed between the two substrates. The LCD device generates an electric field in the liquid crystal layer by applying a voltage to the field-generating electrodes to determine the orientation of liquid crystal molecules in the liquid crystal layer, and controls the polarization of light incident thereupon, thereby displaying an image.

The LCD may include a liquid crystal panel, which converts an electric signal into an image, and a polarizer is attached to an outer surface of the liquid crystal panel. The polarizer polarizes light vibrating in all directions into light vibrating only in a particular direction, thereby allowing a desired image to be realized.

SUMMARY

Exemplary embodiments of the disclosure provide an apparatus and method for attaching a polarizer with substantially reduced or minimized linear bubble.

However, exemplary embodiments of the disclosure are not restricted to those set forth herein. The above and other exemplary embodiments of the disclosure will become more apparent to one of ordinary skill in the art to which the disclosure pertains by referencing the detailed description of the disclosure given below.

According to an exemplary embodiment of the disclosure, a method of attaching a polarizer includes preparing a first stage on which a display panel is disposed and a second stage on which a first polarizer is disposed, measuring a shape of a curl of the first polarizer; determining an attachment direction of the first polarizer with respect to the display panel based on the measured curl shape of the first polarizer; and attaching the first polarizer to a first surface of the display panel by rotating at least one of the first stage and the second stage based on the determined attachment direction.

Other features and aspects will be apparent from the following detailed description, the drawings, and the claims.

BRIEF DESCRIPTION OF THE DRAWINGS

The above and other features of the disclosure will become more apparent by describing in detail exemplary embodiments thereof with reference to the attached drawings, in which.

DETAILED DESCRIPTION

Figure 1:
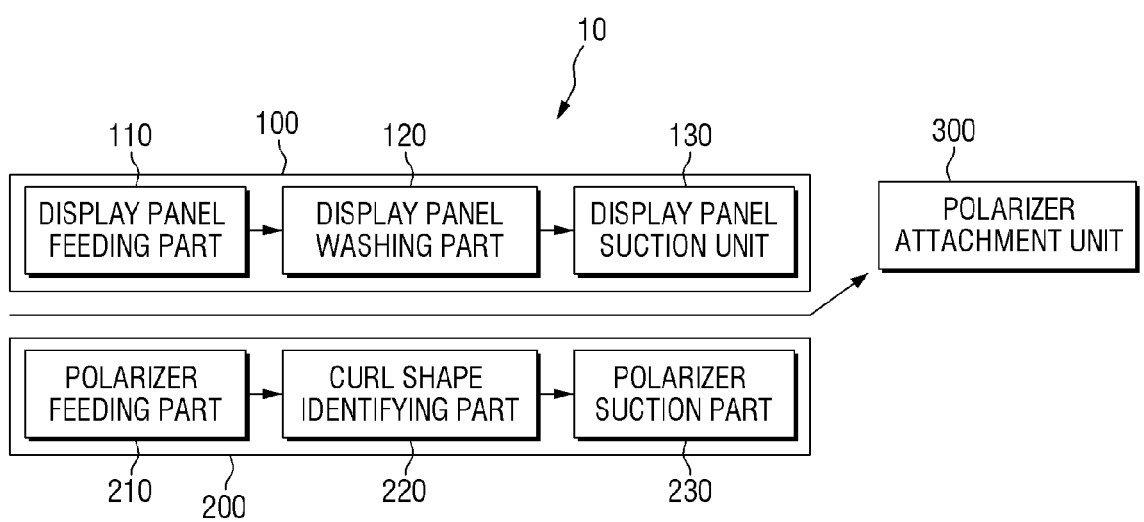
FIG. 1 is a block diagram of an apparatus for attaching a polarizer, according to an exemplary embodiment of the disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. "Or" means "and/or." As used herein, the term "and/or" includes any and all combinations of one or more of the associated listed items. It will be further understood that the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

FIG. 1 is a block diagram of an apparatus for attaching a polarizer, according to an exemplary embodiment of the disclosure.

Referring to FIG. 1, an exemplary embodiment of an apparatus 10 for attaching a polarizer may include a display panel providing unit 100, a polarizer providing unit 200, and a polarizer attachment unit 300.

The display pane providing unit 100 may include a display panel feeding part 110, into which a display panel (DP of FIG. 4) is fed, a display panel washing part 120, which washes the display panel DP, and a display panel suction part 130, which includes a first stage (131 of FIG. 5), to which the display panel DP is to be adhered or attached.

The display panel DP may be fed into the display panel feeding part 110 to perform a process of attaching the display panel DP. The display panel DP may be transferred or fed into the display panel feeding part 110 via, for example, a conveyor belt or a suction device.

The display panel washing part 120 may wash the display panel DP to remove foreign materials from the display panel DP. Although not specifically illustrated, the display panel providing unit 100 may further include a display panel inspecting part, which inspects the display panel DP for any defect before or after the washing of the display panel DP. The display panel inspecting part may determine whether the display panel DP is defective.

The display panel DP may be disposed in the display panel suction part 130. In an exemplary embodiment, the display panel suction part 130 may include the first stage 131 on which the display panel DP is attached or adhered, a first driver, which drives the first stage 131, and a first controller, which controls the operation of the first driver. In one exemplary embodiment, the first stage 131 may be provided in plural. In an exemplary embodiment, the display panel DP may be disposed or accommodated on the first stage 131. The first driver may change the position of the first stage 131 on which the display panel DP is accommodated, and the first controller may align the position of the first stage 131 by controlling the operation of the first driver.

The polarizer providing unit 200 may include a polarizer feeding part 210, a curl shape identifying part 220, and a polarizer suction part 230. The polarizer providing unit 200 may provide one of a first polarizer (pol1 of FIG. 4) and a second polarizer (pol2 of FIG. 4), which is to be attached to the display panel DP. In an exemplary embodiment, an operation for providing the first polarizer pol1 is substantially the same as that for providing the second polarizer pol2. Hereinafter, for convenience of description, an exemplary embodiment, where the polarizer providing unit 200 provides the first polarizer pol1 to be attached to the display panel DP, will be described in detail.

In such an embodiment, the first polarizer pol1 may be provided to the polarizer feeding part 210. The curl shape identifying part 220 may measure a shape of a curl of the first polarizer pol1 and may determine an attachment direction of the first polarizer pol1 based on the shape of the curl of the first polarizer pol1. The curl shape identifying part 220 will be described later in detail.

The polarizer suction part 230 may include a second stage (231 of FIG. 5), on which the first polarizer pol1 is to be disposed or accommodated, a second driver, which drives the second stage 231, and a second controller, which controls the operation of the second driver.

In one exemplary embodiment, the second stage 231 may be provided in plural. In an exemplary embodiment, the first polarizer pol1 may be accommodated on the second stage 231. The second controller may control the second driver and may thus adjust the position of, e.g., moves, the first polarizer pol1 to a location, at which the first polarizer pol1 is to be attached, by driving the second stage 231 on which the first polarizer pol1 is accommodated.

The polarizer attachment unit 300 may tilt the polarizer providing unit 200 at a predetermined angle for the polarizer providing unit 200 to engage with the display panel providing unit 100 and may then apply pressure to attach the first polarizer pol1 to the display panel DP. The polarizer attachment unit 300 may include a roller (300a of FIG. 8), which applies a pressure for attaching the first polarizer pol1 on the display panel DP.

FIGS. 2A to 3B are schematic views illustrating various types of curls that may be formed in a polarizer. The types of curls that may be formed in a polarizer will hereinafter be described with reference to FIGS. 2A to 3B, taking an arbitrary polarizer as an example. For convenience illustration, FIGS. 2A to 3B illustrate a surface-type polarizer, but in general, a polarizer may have a predetermined thickness.

A polarizer may include or be formed of a material that is susceptible to temperature and humidity, and thus, a curl may be formed in the polarizer if a set of conditions suitable for the storage of the polarizer are not met. A curl of the polarizer may be defined as the degree to which the polarizer is bent. More specifically, a curl of the polarizer may be quantified as the height of a most protruding part of the polarizer from a surface plate where the polarizer is placed. The polarizer may have long sides and short sides, which are shorter than the long sides.

Figure 2A:
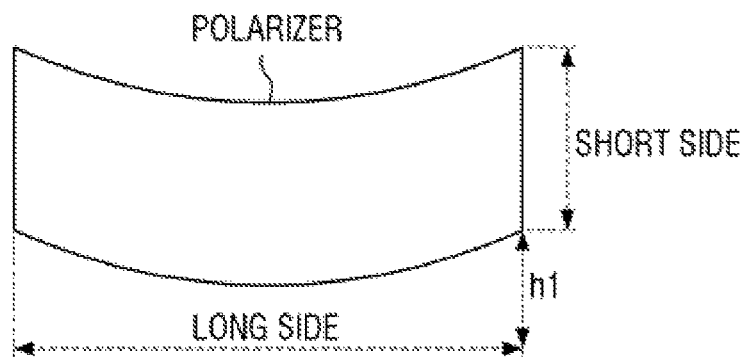
FIGS. 2A to 3B are schematic views illustrating various types of curls that may be formed in a polarizer.
Figure 2B:
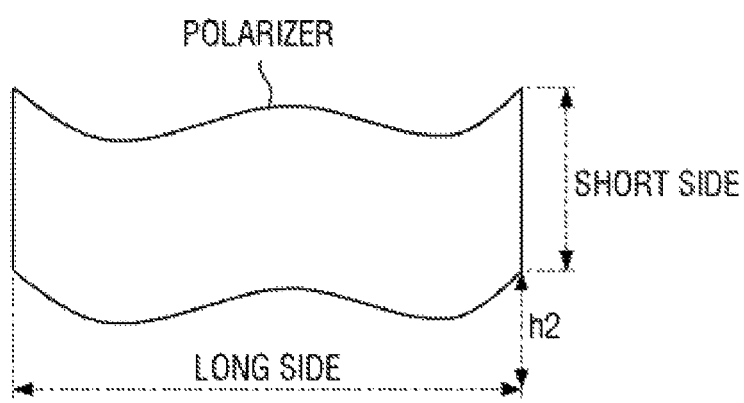

Referring to FIG. 2A, a height h1 from a surface plate (not illustrated) where a polarizer is placed to one side, in a long-side direction, of the polarizer may be defined as the height of a curl of the polarizer. Referring to FIG. 2B, the long sides of a polarizer are parabolic, and thus, a height h2 from a surface plate where the polarizer is placed to one side, in a long-side direction, of the polarizer may be defined as the height of a wave curl of the polarizer in the long-side direction of the polarizer. FIGS. 2A and 2B illustrate an exemplary embodiment in which a curl is formed in a polarizer in a long-side direction of the polarizer.

Figure 3A:
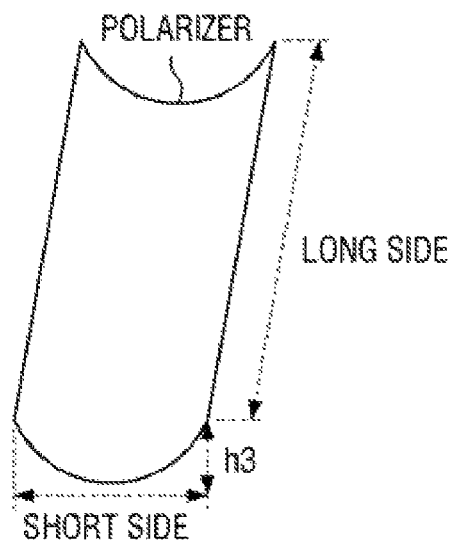
Figure 3B:
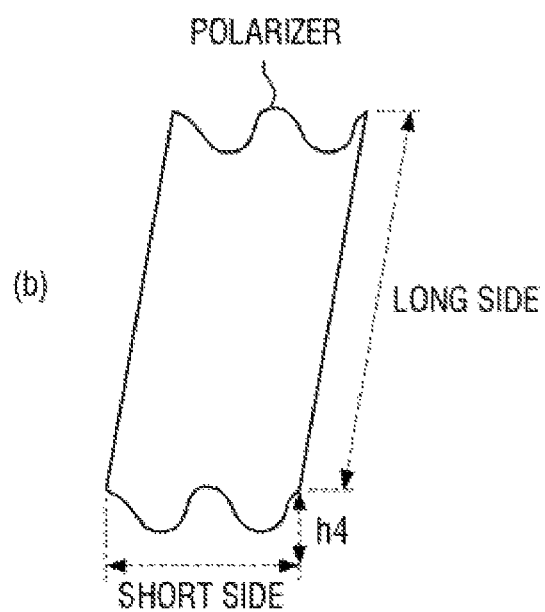

In an exemplary embodiment, referring to FIGS. 3A and 3B, a curl may also be formed in a polarizer in a short-side direction of the polarizer. In such an embodiment, referring to FIG. 3A, a height h3 from a surface plate where a polarizer is placed to one side, in a short-side direction, of the polarizer may be defined as the height of a curl of the polarizer in the short-side direction of the polarizer. Referring to FIG. 3B, the short sides of a polarizer are parabolic, and thus, a height h4 from a surface plate where the polarizer is placed to one side, in a short-side direction, of the polarizer may be defined as the height of a curl of the polarizer in the short-side direction of the polarizer.

When a polarizer with a curl height (any one of h1 through h4) greater than a predetermined value is attached to the display panel DP, problems such as a bonding defect or a misalignment may occur.

Figure 4:
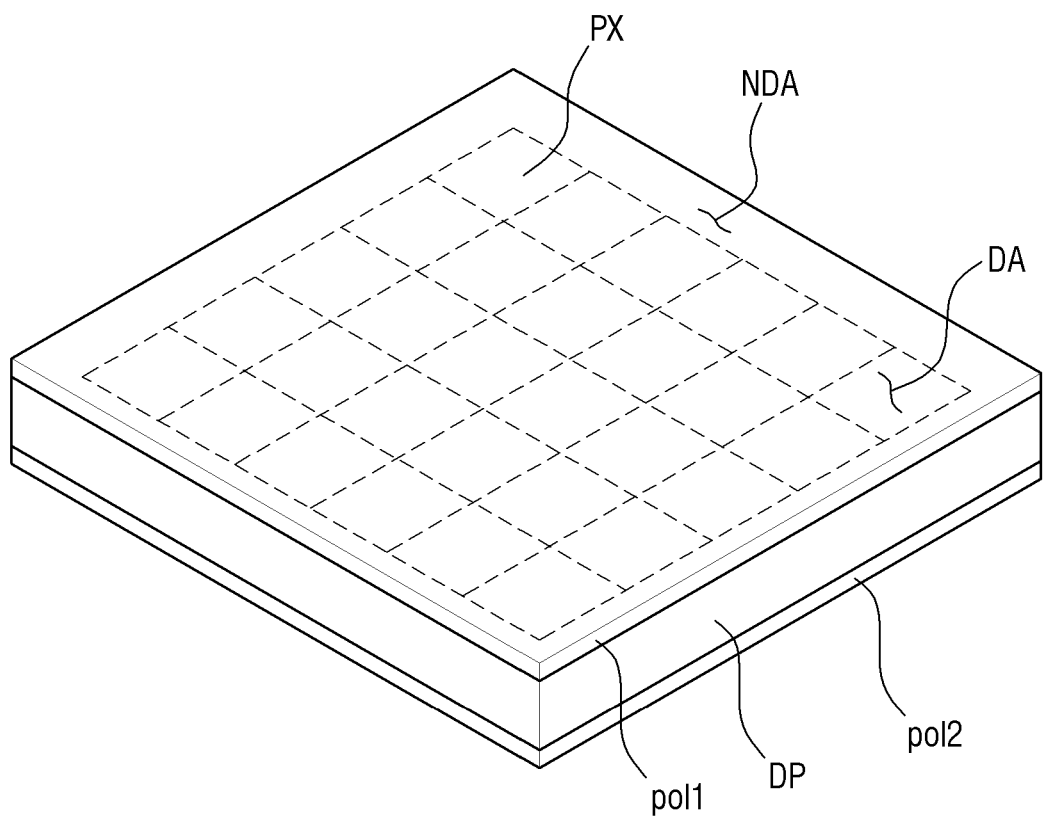
FIG. 4 is a schematic perspective view of an exemplary embodiment of a display panel with a polarizer attached thereto.

FIG. 4 is a schematic perspective view of an exemplary embodiment of a display panel with a polarizer attached thereto.

Referring to FIG. 4, an exemplary embodiment of the display panel DP includes a display area DA, in which an image is displayed, and a non-display area NDA, which is disposed in the periphery of the display area DA. In such an embodiment, a plurality of pixels PX may be disposed in the display area DA.

The first polarizer pol1 may be disposed on or attached to a first surface (e.g., an upper surface) of the display panel DP, and the second polarizer pol2 may be disposed on or attached to a second surface (e.g., a lower surface) of the display panel DP.

Each of the first polarizer pol1 and the second polarizer pol2 may have a transmission axis, which is formed in a predetermined direction, and may transmit light provided thereto from an external source (not illustrated) therethrough in the predetermined direction. The exemplary embodiment will hereinafter be described, taking an example in which the first polarizer pol1 is attached to the display panel DP.

Figure 5:
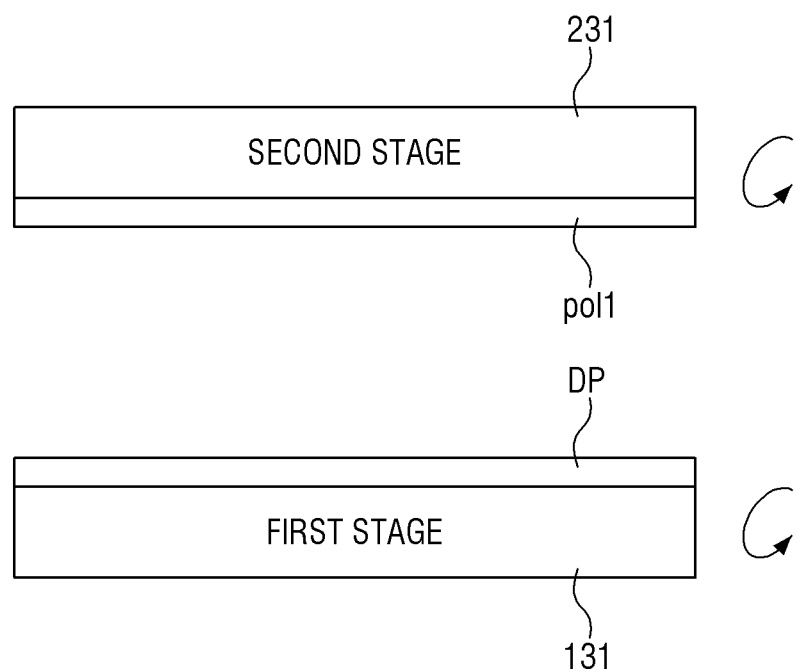
FIG. 5 is a schematic view showing an operation of the apparatus of FIG. 1.
Figure 6:
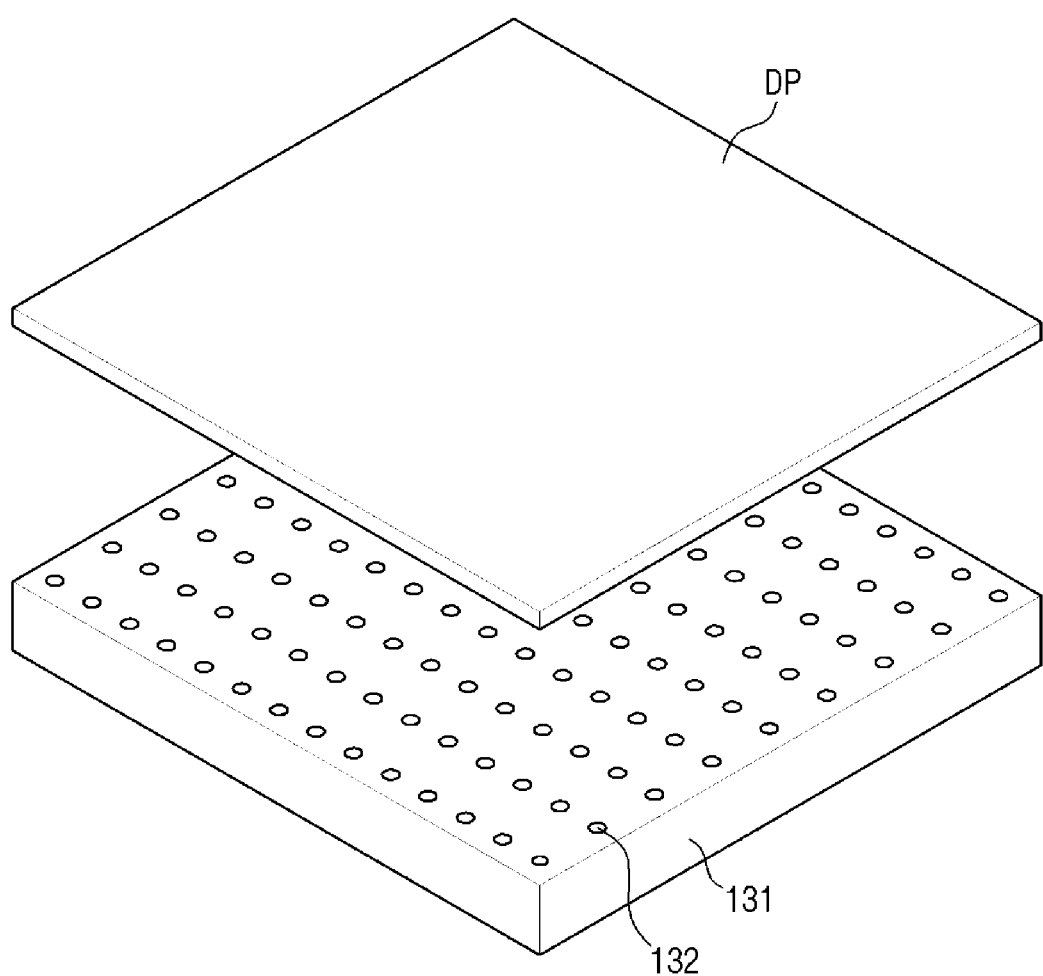
FIG. 6 is a schematic perspective view showing an exemplary embodiment of a process of adhering a display panel to a first stage.

FIG. 5 is a schematic view for explaining the operation of the apparatus according to the exemplary embodiment of FIG. 1. FIG. 6 is a schematic perspective view for explaining a process of adhering a display panel to a first stage.

Referring to FIGS. 5 and 6, the display panel DP may be disposed on the first stage 131. A plurality of suction holes 132, which are connected to a vacuum pump, may be defined on the first stage 131. Accordingly, when the display panel DP is disposed on the first stage 131, the display panel DP may be sucked through the suction holes 132 of the first stage 131, and as a result, the position of the display panel DP on the first stage 131 may be fixed, thereby being adhered to the first stage 131.

The first stage 131 may rotatably move, e.g., be configured to be rotatable. In an exemplary embodiment, the first stage 131 may rotate along an attachment direction determined by the curl shape identifying part 220. Accordingly, the first polarizer pol1 may be attached to the display panel DP in one of a long-side direction and a short-side direction of the first polarizer pol1.

The first polarizer pol1 may be disposed on the second stage 231. In such an embodiment, a plurality of suction holes may be defined or formed on the second stage 231. Accordingly, when the first polarizer pol1 is disposed on the second stage 231, the first polarizer pol1 may be sucked through the suction holes of the second stage 231, and as a result, the position of the first polarizer pol1 on the second stage 231 may be fixed, thereby being adhered to the second stage 231. In one exemplary embodiment, for example, the second stage 231 may be a suction pad with a plurality of suction holes.

The second stage 231 may rotatably move or be configured to be rotatable. In an exemplary embodiment, the second stage 231 may rotate along the attachment direction determined by the curl shape identifying part 220. Accordingly, the first polarizer pol1 may be attached to the display panel DP in one of the long-side direction and the short-side direction of the first polarizer pol1.

In an exemplary embodiment, each of the first stage 131 and the second stage 231 may be rotatable. In such an embodiment, as described above, at least one of the first stage 131 and the second stage 231 may rotate and may thus allow the first polarizer pol1 to be attached to the display panel DP in the attachment direction determined by the curl shape identifying part 220.

Figure 7A:
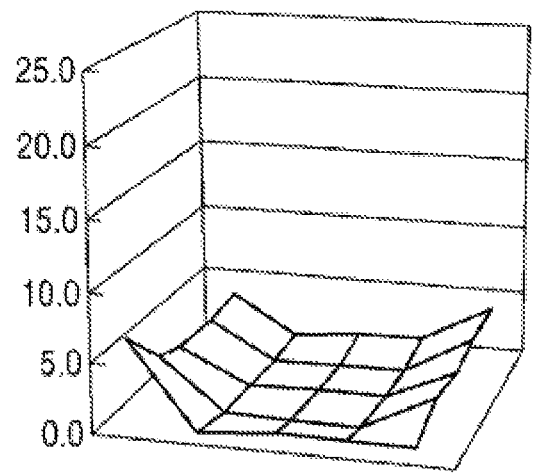
FIGS. 7A to 7C show schematic views for explaining an exemplary embodiment of a process of identifying the shape of a curl of a polarizer.
Figure 7B:
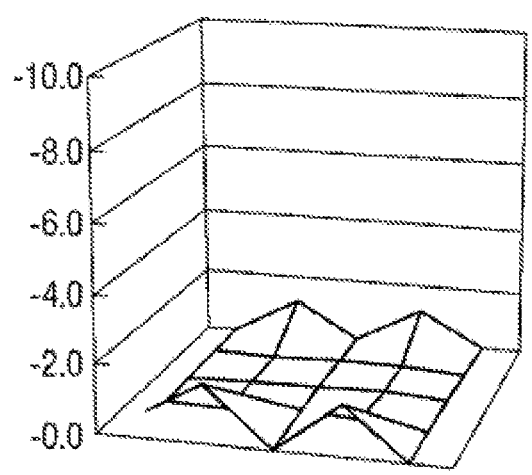
Figure 7C:
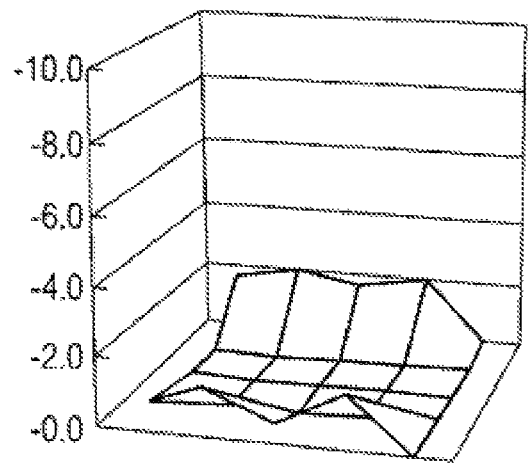
Figure 8:
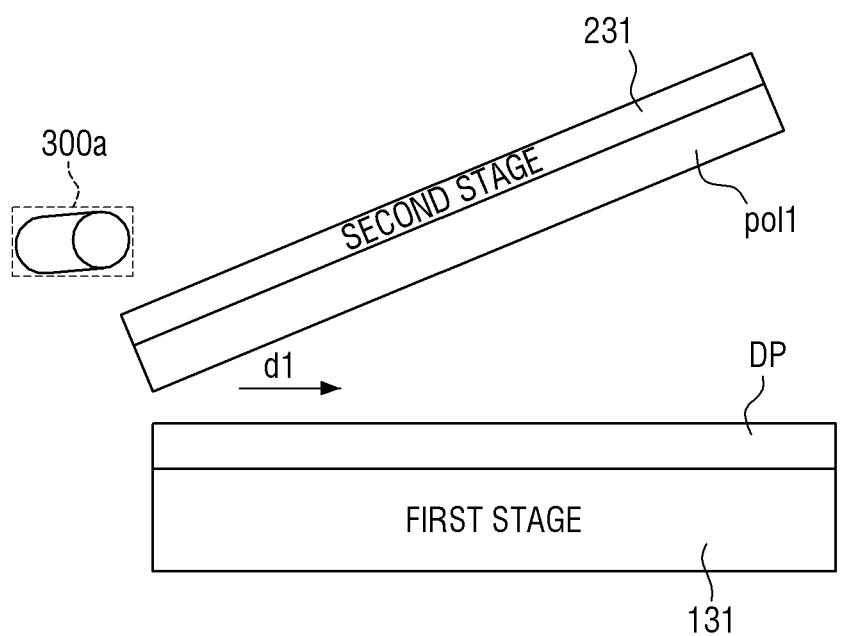
FIGS. 8 and 9 are schematic views for explaining an exemplary embodiment of a process of attaching a polarizer to a display panel.
Figure 9:
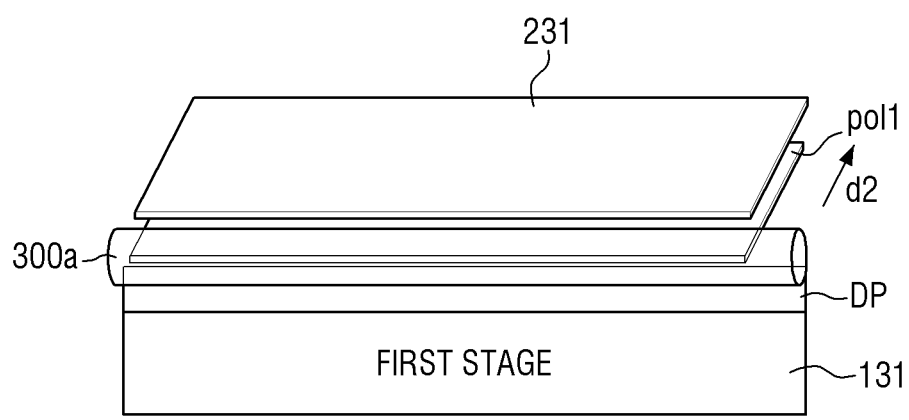
Figure 10:
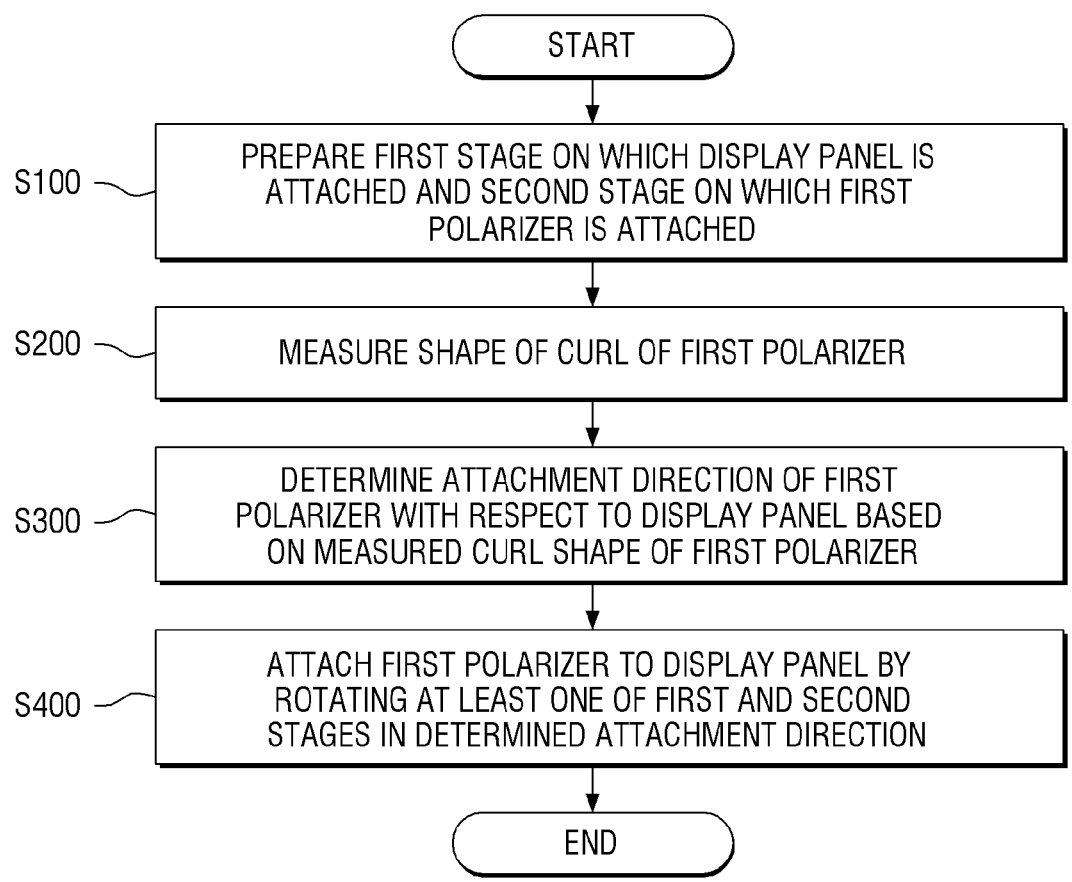
FIG. 10 is a flowchart illustrating a method of attaching a polarizer, according to an exemplary embodiment of the disclosure.

FIGS. 7A to 7C show schematic views for explaining an exemplary embodiment of a process of identifying the shape of a curl of a polarizer. FIGS. 8 and 9 are schematic views for explaining an exemplary embodiment of a process of attaching a polarizer to a display panel. FIG. 10 is a flowchart illustrating a method of attaching a polarizer, according to an exemplary embodiment of the disclosure.

Referring first to FIG. 10, in an exemplary embodiment a method of attaching a polarizer, the first stage 131, to which the display panel DP is attached, and the second stage 231, to which the first polarizer pol1 is attached, are prepared (S100). The display panel DP may be disposed on the first stage 131 such that a surface opposite to the surface of the display panel DP, to which the first polarizer pol1 is attached, may be in contact with the first stage 131. The second stage 231 to which the first polarizer pol1 is attached may be disposed above the first stage 131 at an inclination with respect to the surface of the display panel DP, to which the first polarizer pol1 is attached. In an exemplary embodiment, the first polarizer pol1 may have a protective film attached thereto, and the protective film may be removed before the attachment of the first polarizer pol1 to the display panel DP.

Thereafter, the curl shape identifying part 220 may measure the shape of a curl of the first polarizer pol1 (S200), and the curl shape identifying part 220 may determine an attachment direction of the first polarizer pol1 with respect to the display panel DP based on the measured shape of the curl of the first polarizer pol1 (S300).

In an exemplary embodiment, the curl shape identifying part 220 is not particularly limited to measuring the shape of the curl of the first polarizer pol1 after the placement of the first polarizer pol1 on the second stage 231. In an alternative exemplary embodiment, the curl shape identifying part 220 may measure the height, the type and the direction of the curl of the first polarizer pol1 after the placement of the first polarizer pol1 on the second stage 231.

In an exemplary embodiment, referring to FIGS. 7A to 7C, the curl shape identifying part 220 may measure the shape of the curl of the first polarizer pol1. The term "shape of a curl", as used herein, may include the height, the type, and the direction of the curl. The curl shape identifying part 220 may include a measuring portion, which measures the shape of the curl of the first polarizer pol1.

The measuring portion may include a three-dimensional ("3D") measuring device or a camera, which is capable of measuring the height of the curl of the first polarizer pol1. In one exemplary embodiment, for example, where the measuring portion includes a 3D measuring device, the height, the type and the direction of the curl of the first polarizer pol1 may be identified, as illustrated in FIGS. 7A to 7C.

The curl shape identifying part 220 may further include an attachment direction determining portion, which compares the curl shape measured by the measuring portion with one or more previously-stored curl shapes and determines the attachment direction of the first polarizer pol1 based on the results of the comparison.

The attachment direction determining portion may compare result data provided thereto with previously-stored curl shape data. In such an embodiment, the attachment direction determining portion may include a processor or circuit, which compares the curl shape data from the measuring portion with previously-stored curl shape data, and a memory, which stores the previously-stored curl shape data. The attachment direction determining portion may determine the attachment direction of the first polarizer pol1 by comparing the curl shape data provided thereto with the previously-stored curl shape data. The previously-stored curl shape data may include an ideal attachment direction corresponding to at least one of the height, the type, and the direction of a curl of each polarizer.

The term "ideal attachment direction", as used herein, may indicate an attachment direction capable of minimizing a linear bubble that may be formed in the process of attaching a polarizer to a display panel due to a curl of the polarizer. An attachment direction of a polarizer may include a long-side direction and a short-side direction of the polarizer. The attachment, in a long-side direction, of a polarizer to a display panel may indicate placing a polarizer in contact with a display panel, beginning from a long side of the polarizer, and applying pressure to the polarizer to attach the polarizer to the display panel, and the attachment, in a short-side direction, of a polarizer to a display panel may indicate placing a polarizer in contact with a display panel, beginning from a short side of the polarizer, and applying pressure to the polarizer so as to attach the polarizer to the display panel.

Thereafter, at least one of the first stage 131 and the second stage 231 may rotate in the attachment direction determined in S300 for the first polarizer pol1 to be attached to the display panel DP in the determined attachment direction (S400).

Hereinafter, an exemplary embodiment in which the attachment direction determined in S300 is the short-side direction of the first polarizer pol1 will be described in detail with reference to FIG. 8.

Referring to FIG. 8, at least one of the first stage 131 and the second stage 231 may rotate in the short-side direction of the first polarizer pol1 for the first polarizer pol1 to be attached to the display panel DP. In an exemplary embodiment, at least one of the first stage 131 and the second stage 231 may rotate in a way such that one side, in the short-side direction, of the first polarizer pol1 may be placed first in contact with the display panel DP. Thereafter, the roller 300a may rotate and may thus apply pressure to the first polarizer pol1 on the first surface of the display panel DP toward the first surface of the display panel DP, e.g., downwardly. As a result, the first polarizer pol1 may be effectively attached to the first surface of the display panel DP in the short-side direction of the first polarizer pol1.

Hereinafter, an exemplary embodiment in which the attachment direction determined in S300 is the long-side direction of the first polarizer pol1 will be described in detail with reference to FIG. 9.

Referring to FIG. 9, at least one of the first stage 131 and the second stage 231 may rotate in the long-side direction of the first polarizer pol1 for the first polarizer pol1 to be attached to the display panel DP. In such an embodiment, at least one of the first stage 131 and the second stage 231 may rotate in a way such that one side, in the long-side direction, of the first polarizer pol1 may be placed first in contact with the display panel DP. Thereafter, the roller 300a may rotate and may thus apply pressure to the first polarizer pol1 on the first surface of the display panel DP toward the first surface of the display panel DP, e.g., downwardly. As a result, the first polarizer pol1 may be attached to the first surface of the display panel DP in the long-side direction of the first polarizer pol1.

In an exemplary embodiment, the apparatus 10 may further include a turnover unit (not shown), which turns the display panel DP over (e.g., turns the display panel upside down) to attach the second polarizer pol2 to the second surface of the display panel DP. The apparatus 10 may measure the shape of a curl of the second polarizer pol2 and may determine an attachment direction of the second polarizer pol2 based on the measured curl shape of the second polarizer pol2. Thereafter, the apparatus 10 may attach the second polarizer pol2 to the second surface of the display panel DP by rotating at least one of the first stage 131 and the second stage 231.

Figure 11A:
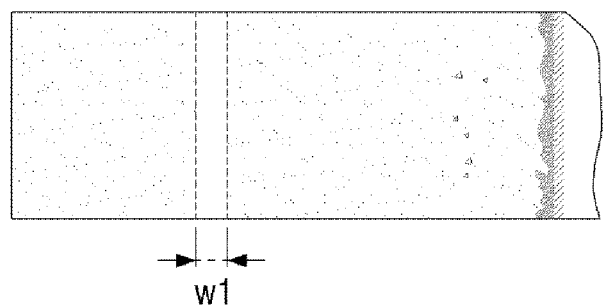
FIGS. 11A and 11B are schematic views showing polarizers attached to a display panel by a conventional apparatus for attaching a polarizer and the apparatus according to the exemplary embodiment of FIG. 1, respectively.
Figure 11B:
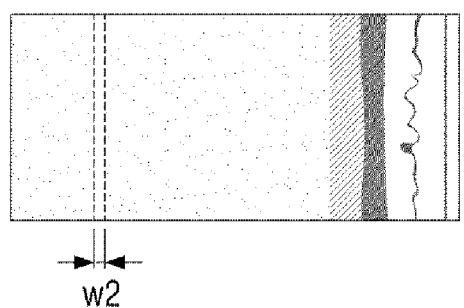

FIGS. 11A and 11B are schematic views showing polarizers attached to a display panel by a conventional apparatus for attaching a polarizer and the apparatus according to the exemplary embodiment of FIG. 1, respectively.

More specifically, FIG. 11A illustrates a linear bubble that may be formed when attaching a polarizer to a display panel in one attachment direction using a conventional apparatus for attaching a polarizer. FIG. 11B illustrates a linear bubble that may be formed when attaching a polarizer to a display panel in an attachment direction determined based on the shape of a curl of the polarizer, using the apparatus according to the exemplary embodiment of FIG. 1.

A width w1 of the linear bubble of FIG. 11A may be about 100 micrometers (µm), and a width w2 of the linear bubble of FIG. 11B may be about 40 µm. That is, the linear bubble of FIG. 11B may be narrower than the linear bubble of FIG. 11A.

Accordingly, in an exemplary embodiment, the apparatus 10 may determine an attachment direction capable of minimizing a linear bubble by measuring the shape of a curl of a polarizer, and may attach the polarizer to the display panel DP in the determined attachment direction by rotating at least one of the first stage 131 on which the display panel DP is disposed and the second stage 231 on which the polarizer is disposed. Accordingly, the formation of a linear bubble may be minimized, as compared to a case in which a polarizer is attached in only one direction without consideration of the shape of the curl of the polarizer.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of attaching a polarizer, the method comprising:
    preparing a first stage, on which a display panel is disposed, and a second stage, on which a first polarizer is disposed;
    measuring a shape of a curl of the first polarizer;
    determining an attachment direction of the first polarizer with respect to the display panel based on the measured curl shape of the first polarizer; and
    attaching the first polarizer to a first surface of the display panel by rotating at least one of the first stage and the second stage based on the determined attachment direction.

2. The method of claim 1, wherein the measuring the shape of the curl of the first polarizer, comprises measuring a height, a direction and a type of the curl of the first polarizer.

3. The method of claim 1, wherein the determining the attachment direction of the first polarizer, comprises:
    measuring the shape of the curl of the first polarizer;
    comparing the measured curl shape of the first polarizer with previously-stored curl shapes; and
    determining the attachment direction of the first polarizer based on a result of the comparing.

4. The method of claim 1, wherein
    the first polarizer comprises long sides and short sides, which are shorter than the long sides; and
    the determining the attachment direction of the first polarizer, comprises:
        determining a direction of the short sides of the first polarizer as the attachment direction of the first polarizer when the curl of the first polarizer is formed in a direction of the long sides of the first polarizer; and
        determining the direction of the long sides of the first polarizer as the attachment direction of the first polarizer when the curl of the first polarizer is formed in the direction of the short sides of the first polarizer.

5. The method of claim 4, further comprising:
    rotating at least one of the first stage and the second stage in a way such that one of the long sides of the first polarizer is placed initially in contact with the display panel when the attachment direction of the first polarizer is the direction of the long sides of the first polarizer; and
    rotating at least one of the first stage and the second stage in a way such that one of the short sides of the first polarizer is placed initially in contact with the display panel when the attachment direction of the first polarizer is the direction of the short sides of the first polarizer.

6. The method of claim 1, wherein the measuring the shape of the curl of the first polarizer, comprises using a three-dimensional measuring device or a camera, which measures the curl of the first polarizer.

7. The method of claim 1, further comprising:
    preparing the second stage on which the first polarizer is removed and a second polarizer is disposed;
    measuring a shape of a curl of the second polarizer, and determining an attachment direction of the second polarizer based on the measured curl shape of the second polarizer; and
    attaching the second polarizer to a second surface of the display panel, which is opposite to the first surface of the display panel, by rotating at least one of the first stage and the second stage based on the determined attachment direction.

8. The method of claim 4, further comprising:
    rotating at least one of the first stage and the second stage in a way such that one side of the polarizer corresponding to the determined attachment direction is placed initially in contact with the display panel.

* * * * *